(12) United States Patent
Crowther et al.

(10) Patent No.: US 8,022,154 B2
(45) Date of Patent: Sep. 20, 2011

(54) ETHYLENE POLYMERS, THEIR PRODUCTION AND USE

(75) Inventors: Donna J. Crowther, Seabrook, TX (US); Kuangyao Brian Peng, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 244 days.

(21) Appl. No.: 12/266,360

(22) Filed: Nov. 6, 2008

(65) Prior Publication Data

US 2010/0113706 A1    May 6, 2010

(51) Int. Cl.
*C08F 4/72* (2006.01)
*C08F 210/00* (2006.01)
*C08F 4/44* (2006.01)
*C08L 23/00* (2006.01)

(52) U.S. Cl. ........ 526/170; 525/240; 526/130; 526/134; 526/160; 526/348; 526/352

(58) Field of Classification Search ............. 526/72, 526/130, 134, 160, 170, 348, 352; 525/240
See application file for complete search history.

(56) References Cited

U.S. PATENT DOCUMENTS

| | | | |
|---|---|---|---|
| 4,935,474 A | 6/1990 | Ewen et al. | |
| 4,962,262 A | 10/1990 | Winter et al. | |
| 5,023,388 A | 6/1991 | Lüker | |
| 5,081,322 A | 1/1992 | Winter et al. | |
| 5,241,025 A | 8/1993 | Hlatky et al. | |
| 5,464,905 A | 11/1995 | Tsutsui et al. | |
| 5,693,727 A | 12/1997 | Goode et al. | |
| 5,723,705 A | 3/1998 | Herrmann et al. | |
| 5,936,108 A | 8/1999 | Lin et al. | |
| 6,037,296 A | 3/2000 | Hsieh et al. | |
| 6,117,962 A | 9/2000 | Weng et al. | |
| 6,184,327 B1 | 2/2001 | Weng et al. | |
| 6,197,910 B1 | 3/2001 | Weng et al. | |
| 6,218,488 B1 | 4/2001 | Schiffino et al. | |
| 6,242,545 B1 | 6/2001 | Jejelowo et al. | |
| 6,252,019 B1 | 6/2001 | Ewen | |
| 6,258,903 B1 | 7/2001 | Mawson et al. | |
| 6,340,730 B1 | 1/2002 | Murray et al. | |
| 6,462,135 B1 | 10/2002 | Rohde et al. | |
| H2058 H | 1/2003 | Brandolini et al. | |
| 6,858,765 B2 | 2/2005 | Toyoda | |
| 6,936,675 B2 * | 8/2005 | Szul et al. | 526/348.2 |
| 7,078,467 B1 | 7/2006 | Kolb et al. | |
| 7,087,668 B2 | 8/2006 | Hohner et al. | |
| 7,125,933 B2 | 10/2006 | German et al. | |
| 7,135,526 B2 | 11/2006 | Farley et al. | |
| 7,157,531 B2 | 1/2007 | Szul et al. | |
| 7,332,551 B2 | 2/2008 | Rodriguez et al. | |
| 2003/0019400 A1 | 1/2003 | Deckers et al. | |
| 2003/0050381 A1 | 3/2003 | Hohner et al. | |
| 2003/0171481 A1 | 9/2003 | Toyoda | |
| 2005/0137337 A1 | 6/2005 | Kwalk | |
| 2005/0256245 A1 | 11/2005 | Lechner et al. | |
| 2005/0282980 A1 | 12/2005 | Szul et al. | |
| 2006/0009542 A1 | 1/2006 | Schmalzl et al. | |
| 2006/0025508 A1 | 2/2006 | Lechner et al. | |
| 2006/0068985 A1 | 3/2006 | Razavi | |
| 2006/0074171 A1 | 4/2006 | Bach et al. | |
| 2006/0122342 A1 | 6/2006 | Hoang et al. | |
| 2006/0140894 A1 | 6/2006 | Toyoda et al. | |
| 2006/0167192 A1 | 7/2006 | Aarila et al. | |
| 2006/0281878 A1 | 12/2006 | Kolb et al. | |
| 2007/0043177 A1 | 2/2007 | Michie, Jr. et al. | |
| 2007/0213205 A1 | 9/2007 | Mihan | |

FOREIGN PATENT DOCUMENTS

| | | |
|---|---|---|
| DE | 10 009 751 | 9/2001 |
| EP | 0 355 439 | 2/1990 |
| EP | 0 702 030 | 3/1996 |
| EP | 0 770 629 | 5/1997 |
| JP | 62-129303 | 6/1987 |
| JP | 2004-036029 | 2/2004 |
| JP | 2004-059868 | 2/2004 |
| JP | 2004-059869 | 2/2004 |
| JP | 2004-034463 | 5/2004 |
| JP | 2006-143783 | 6/2006 |
| SU | 220498 | 9/1970 |
| WO | WO 2004/101674 | 11/2004 |
| WO | WO 2005/061225 | 7/2005 |
| WO | WO 2005/103100 | 11/2005 |
| WO | WO 2007/615787 | 5/2007 |

OTHER PUBLICATIONS

Schmid et al., Unverbruckte Indenylkomplexe mit Metallen der vierten Gruppe als Katalysatoren bei der homogenen Olefinpolymerisation, Journal of Organometallic Chemistry, 1996, vol. 514, No. 1, pp. 45-49.

Yano et al., Homo- and Copolymerization of Ethylene by Cationic Hafnocene Catalysts Based on Tetrakis(pentafluorophenyl)borate, Macromolecular Chemistry and Physics, 1999, vol. 200, No. 4, pp. 924-932.

Paul J. Flory, Principles of Polymer Chemistry, Cornell University Press, Ithaca and London, 1953, p. 310.

* cited by examiner

*Primary Examiner* — Irina S Zemel
*Assistant Examiner* — Jeffrey Lenihan

(57) ABSTRACT

This invention relates to an ethylene polymer comprising ethylene and up to 5 mole % of at least one comonomer, wherein the ethylene polymer has an Mw, of 10,000 to 50,000, an Mw/Mn of between 1.5 to 4.5, a density of at least 0.925 g/cc, an unsaturation level of less than 1 per 1000 carbons, a melting point of at least 120° C., a Tc of greater than Z° C., where Z=0.501×(density in kg/m$^3$)−367, and a Brookfield viscosity o at 140° C. of 100,000 mPas or more.

27 Claims, No Drawings

ETHYLENE POLYMERS, THEIR PRODUCTION AND USE

FIELD OF THE INVENTION

The present invention relates to medium molecular weight ethylene polymers, their production and their use.

BACKGROUND OF THE INVENTION

Low molecular weight polyethylene waxes are frequently used as additives in coating materials such as printing inks for purposes such as an improvement of abrasion resistance, reduction of tackiness, prevention of blocking, and improvements of water resistance and water repellency of the printed film. Other uses of waxes are in hot melt compositions, such as solvent-free adhesives, as dispersants for pigments and in blends with higher molecular weight polymers. One example of a polyethylene wax is described in U.S. Pat. No. 6,858,765 and comprises an ethylene (co)polymer having a Tc of less than or equal to $0.501 \times$(density in kg/m$^3$)$-367$. The examples disclose use of significant amounts of hydrogen and dimethylsilyl (t-butylamide) (tetramethyl-cyclopentadienyl) titanium dichloride. Further the catalysts disclosed in column 6, line 48 to column 7 line 12, are bridged and do not have seven substitutions or the Cp groups are not different. Another example of a polyethylene wax is described in U.S. Pat. No. 5,723,705 in which the wax has a viscosity number of 2 to 100 cm$^3$/g and is made using a molar ratio of olefin to hydrogen of 2 to 200.

U.S. Patent Application Publication No. 2003/0019400 discloses a polyethylene wax produced by polymerization in the presence of a metallocene compound, although the only specific metallocene compounds listed as suitable are zirconium and titanium dichlorides and the only metallocene exemplified is bis(n-butyl-cyclopentadienyl) zirconium dichloride activated with MAO. The example polymerization at 60° C. in the absence of hydrogen obtained a PE wax having an Mw of 4900 g/mol.

U.S. Patent Application Publication No. 2006/0074171, published Apr. 6, 2006, discloses polyolefin waxes, useful in hot melt compositions, having a melt viscosity at 170° C. of between 20 and 40,000 mPas. Further the only metallocene compounds exemplified are zirconium compounds and larger amounts of hydrogen appear to be used in the polymerization process.

WO 2007/061587 discloses metallocene polyethylenes having, among other things, a melt index of 1.1 to 1.6 dg/min and a density of 0.913 to 0.912 g/cc.

Hafnocenes are useful as ethylene polymerization catalysts, although generally their use has been focused on the production of high molecular weight materials. For example, U.S. Pat. No. 6,218,488 discloses a polymerization process using bridged hafnocenes to make ethylene copolymers having a density less than 0.915 and exemplifies molecular weights over 60,000, typically over 100,000.

In addition, WO 2005/103100 discloses a dual catalyst process for preparing ethylene copolymers having Mw/Mn of 6 to 100.

Moreover, U.S. Pat. No. 7,332,551 discloses polymerization of ethylene and propylene mixtures in the presence of dimethylsilylbis(indenyl)hafnium dimethyl to produce copolymers having an Mw of over 50,000.

US 2005/0282980 discloses certain hafnium catalysts used in the presence of hydrogen to make polyethylene having a melt index (190° C., 1.16 kg) of 1.4 g/10 min or less.

According to the present invention, it has now been found that certain catalyst compounds, when combined with a non-coordinating anion activator, are effective in the gas phase polymerization of ethylene to produce a novel series of high density, medium molecular weight polymers. These polymers not only exhibit attractive properties for use in traditional wax applications but also can be combined with higher molecular weight polyethylene, typically by in-reactor-blending, to produce polymer blends with enhanced physical properties.

SUMMARY OF THE INVENTION

This invention relates to an ethylene polymer comprising ethylene and from 0 to 5 mole % of at least one comonomer, wherein the ethylene polymer has an Mw of 10,000 to 50,000 g/mol, an Mw/Mn of 1.5 to 4.5, a density of at least 0.925 g/cc, an unsaturation level of less than 1 unsaturation per 1000 C's, a melting point of at least 120° C., a Tc of greater than Z ° C., where Z=$0.501 \times$(density (in g/cc)$\times 1000$)$-367$, and a Brookfield viscosity at 140° C. of 100,000 mPas or more.

This invention further relates to a process to make ethylene polymers comprising:

1) contacting ethylene and optionally at least one comonomer at a temperature of about 60° C. to about 105° C. in the gas phase, in the presence of from 0 to $100 \times 10^{-6}$ mols of hydrogen per mole of ethylene, with a catalyst system comprising a support, a non-coordinating anion activator and a transition metal compound of the formula:

wherein T is a bridging group, n is 0 or 1, A and B are different substituted cyclopentadienyl ligands, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, provided that when n is 1, then A and B are, independently, represented by the formula: $R^*_4$—Cp, where each $R^*$ is, independently, hydrogen or a $C_1$ to $C_8$ alkyl groups, and at least seven $R^*$ groups are not hydrogen;

2) obtaining a polymer comprising ethylene and from 0 to 5 mole % of at least one comonomer, wherein the polymer has an Mw from 10,000 to 50,000 g/mol, an Mw/Mn of 1.5 to 4.5, a density of at least 0.925 g/cc or more, an unsaturation level of less than 1 per 1000 carbon atoms, a Tm of at least 120° C., a Tc of greater than Z° C., where Z=$0.501 \times$(density (in g/cc)$\times 1000$)$-367$, and a Brookfield viscosity at 140° C. of 100,000 mPas or more.

DETAILED DESCRIPTION OF THE INVENTION

Definitions

As used herein, the numbering scheme for the Periodic Table groups is the new notation as set out in CHEMICAL AND ENGINEERING NEWS, 63 (5), 27 (1985).

As used herein, Me is methyl, Et is ethyl, t-Bu and $^t$Bu are tertiary butyl, nBu and n-Bu are n-butyl, iPr and $^i$Pr are isopropyl, Cy is cyclohexyl, THF (also referred to as thf) is tetrahydrofuran, Mw is weight average molecular weight, Mn is number average molecular weight, Mz is z average molecular weight, Bn is benzyl, and Ph is phenyl.

The terms "hydrocarbyl radical," "hydrocarbyl" and "hydrocarbyl group" are used interchangeably throughout this document. Likewise the terms "group", "radical", and "substituent" are also used interchangeably in this document.

For purposes of this disclosure, "hydrocarbyl radical" is defined to be $C_1$-$C_{100}$ radicals, that may be linear, branched, or cyclic, and when cyclic, aromatic or non-aromatic.

By "substituted" is meant that a hydrogen is replaced with a hydrocarbyl group or a heteroatom or heteroatom containing group. For example tetramethylcyclopentadiene is a cyclopentadiene substituted with four methyl groups and ethyl alcohol is an ethyl group substituted with an —OH group.

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units. Further a homopolymer is a polymer of one monomer type, while a copolymer is a polymer of two or more different monomer types. An "ethylene polymer" is a polymer having 50 mole % or more ethylene monomer units. (Preferred ethylene polymers of this invention have 75 mole % or more, preferably 85 mole % or more preferably 90 mole % or more of ethylene monomer units.)

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety. The transition metal compound may be neutral as in a precatalyst, or a charged species with a counter ion as in an activated catalyst system.

Catalyst precursor is also often referred to as precatalyst, catalyst, catalyst compound, transition metal compound or transition metal complex. These words are used interchangeably. Activator and cocatalyst are also used interchangeably. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst.

The term "continuous" is defined to mean a system that operates without interruption or cessation. For example a continuous process to produce a polymer would be one where the reactants are continually introduced into one or more reactors and polymer product is continually withdrawn.

DETAILED DESCRIPTION

This invention further relates to an ethylene polymer comprising ethylene and from 0 to 5 mole % (preferably from 0.1 to 4 mole %, preferably from 0.25 to 4.5 mole %, preferably from 0.5 to 3 mole %) of at least one comonomer (preferably a C3 to C12 alpha-olefin, preferably propylene, butene, hexene and or octene), wherein the ethylene polymer has:
1) an Mw from 10,000 to 50,000 g/mol (preferably 20,000 to 50,000 g/mol),
2) an Mw/Mn of 1.5 to 4.5 (preferably form 1.5 to 4, preferably 2.0 to 3.5),
3) a density of at least 0.925 g/cc or more (preferably 0.930 g/cc or more),
4) an unsaturation level of less than 1 per 1000 carbon atoms (preferably less than 0.9, preferably less than 0.8),
5) a Tm of at least 120° C. (preferably 125° C. or more, preferably 130° C. or more),
6) a Brookfield viscosity at 140° C. of 100,000 mPas or more (preferably 120,000 mPas or more),
7) a Tc of greater than Z ° C., where Z=0.501×(density (in g/cc)×1000)−367, and the ethylene polymer optionally has one or more of the following:
   i) a Brookfield viscosity at 177° C. of 10,000 mPas or more (preferably 20,000 mPas or more), and or
   ii) an Mz/Mw of 3 or less (preferably 2.5 or less), and or
   iii) a Melt Index (190° C. 2.16 kg) of 100 dg/min or more (preferably 200 dg/min or more), and or
   iv) an SCDBI greater than 50% (preferably greater than 60%).

The polymers produced herein typically have a melting temperature of 120° C. or more, alternately 125° C. or more, alternately 130° C. or more, alternately 135° C. or more.

The polymers produced herein typically have a crystallization temperature (Tc) of 97° C. or more, alternately 100° C. or more, alternately 105° C. or more, alternately 110° C. or more.

In another embodiment the polymers produced herein have a Tc of greater than Z ° C., when Z=0.501×(density(in g/cc)× 1000)−367.

Melting temperature ($T_m$) and crystallization temperature (Tc) are measured using Differential Scanning Calorimetry (DSC) using commercially available equipment such as a TA Instruments 2920 DSC. Typically, 6 to 10 mg of the sample is sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the polymers described herein have an Mw (measured by GPC as described below) of 10,000 to about 50,000 g/mol, alternately 15,000 to 45,000 g/mol, alternately 20,000 to 40,000 g/mol, alternately 28,000 to 32,000 g/mol.

In some embodiments, the polymers of this invention have an Mw/Mn of 1.5 to 4.5, alternately 1.7 to 4, alternately 2 to 4.0, alternately 2 to 3.5.

In some embodiments, the polymers of this invention have an Mz/Mw of 3 or less, alternately 2.5 or less, alternately from 1.5 to 3, alternately from 1.5 to 2.5.

Mn, Mw and Mz are measured by GPC using a High Temperature Size Exclusion Chromatograph (either from Waters Corporation or Polymer Laboratories), equipped with a differential refractive index detector (DRI). Experimental details not described below, including how the detectors were calibrated, are described in: T. Sun, P. Brant, R. R. Chance, and W. W. Graessley, Macromolecules, Volume 34, Number 19, 6812-6820, (2001). Three Polymer Laboratories PLgel 10 mm Mixed-B columns are used. The nominal flow rate is 0.5 cm³/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration is from 1.0 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8-9 hours before injecting the first sample. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm$^3$, molecular weight is expressed in g/mole, and intrinsic viscosity is expressed in dL/g.

In another embodiment, the polymers described herein have a density of at least 0.925 g/cc, preferably at least 0.930 g/cc, preferably at least 0.965 g/cc, preferably at least 0.940 g/cc. Alternately, the polymers have a density between 0.925 to 0.965 g/cc, preferably between 0.935 to 0.955, preferably 0.940 to 0.950 g/cc. Density is determined using chips cut from plaques compression molded in accordance with ASTM D-4703-07 and aged for 40 hrs at 23° C. plus or minus 2° C. and measured as specified by ASTM D-1505, unless otherwise stated.

In a another embodiment, the polymers produced herein have a short chain branching distribution index (SCBDI) of greater than 50%, preferably greater than 60% preferably greater than 70% as determined by CRYSTAF. Alternately the SCDBI is 60 to 80%.

SCBDI (short chain branching distribution index) is determined by crystallization analysis fractionation (CRYSTAF) using a CRYSTAF 200 unit commercially available from PolymerChar, Valencia, Spain using the provided CRYSTAF Software program (Version 2001.b, PolymerChar, Valencia, Spain). Specifically, the polymer samples are dissolved in 1,2,4 trichlorobenzene at 160° C. (0.66 mg/mL) for 1 hour and stabilized at 95° C. for 45 minutes. The sampling temperatures range from 95° C. to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer. The CRYSTAF peak temperatures, peak areas, and other parameters are identified by the peak analysis module included in the CRYSTAF Software (Version 200Lb, PolymerChar, Valencia, Spain). The CRYSTAF peak finding routine identifies a peak temperature as a maximum in the dW/dT and the area between the largest positive inflections on either side of the identified peak in the derivative curve. The integral of the curve provides the relative quantity of each resin component. To calculate the CRYSTAF curve, the preferred processing parameters are with a temperature limit of 70° C. and with smoothing parameters above the temperature limit of 0.1, and below the temperature limit of 0.3. In addition to peak temperatures and minimums, overall breadth of the polymer fractions can be determined as well. One measure of this value is the dispersity index (R) which is defined by the formula: $R = 100 \times (Tw/Tn - 1)$, where, Tw=weight average temperature $(\Sigma[Ci]*Ti)/(\Sigma[Ci])$, and Tn=number average temperature $(\Sigma[Ci])/((\Sigma[Ci])/Ti)$, wherein Ci=concentration and T=temperature in ° C. Tw and Tn are calculated by the CRYSTAF software (Version 2001.b). In a preferred embodiment, R is less than 6.5, preferably 6.45 or less, preferably 5 or less, preferably 4.5 or less.

In another embodiment, the polymers produced herein have a solubility distribution breadth index (SDBI) of 22° C. or less, preferably 20° C. or less, preferably 19° C. or less. In another embodiment, the polymers described herein have a composition distribution breadth index (CDBI) of greater than 50%, preferably greater than 60%, preferably greater than 65%. In other embodiments the polymers described herein have a CDBI of less than 50%, alternately between 10 and 50%, alternately between 25 and 50%. SDBI and CDBI are determined as described in WO 93/03093, including the TREF method cited in U.S. Pat. No. 5,008,204 which is incorporated by reference herein.

In another embodiment, the polymers produced herein have an unsaturation level of less than 1 per 1000 carbon atoms (as measured by $^1$H NMR), preferably less than 0.5 per 1000 carbon atoms, preferably less than 0.1 per 1000 carbon atoms.

$^1$H NMR data is collected at 120° C. in a 5 mm probe using a Varian spectrometer with a $^1$Hydrogen frequency of at least 400 MHz. Data is recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons.

The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

In another embodiment, the polymers produced herein have a melt index (MI) of 100 dg/min or more, preferably 400 dg/min or more, preferably 600 dg/min or more. MI is determined according to ASTM 1238 (190° C., 2.16 kg).

In another embodiment the polymers herein have a branching index (g' avg) of 0.95 more, preferably 0.975 or more, preferably 0.99 or more. Branching index ($g'_{ave}$) is determined using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\theta_l$ is the intrinsic viscosity of a linear polymer of the same viscosity-averaged molecular weight ($M_v$) as the branched polymer. $\eta_l = KM_v^\alpha$, K and $\alpha$ are measured values for linear polymers and should be obtained on the same SEC-DRI-LS-VIS instrument as the one used for branching index measurement (as described by Paul J. Flory at page 310 of PRINCIPLES OF POLYMER CHEMISTRY (1953)). For the ethylene polymers of this invention, K=0.00058 for ethylene homopolymer, and $\alpha$=0.695 for all ethylene polymers. The SEC-DRI-LS-VIS is calibrated with both polystyrene and low molecular weight polyethylene standards. The SEC-DRI-LS-VIS method obviates the need to correct for polydispersities, since the intrinsic viscosity and the molecular weight are measured at individual elution volumes, which arguably contain narrowly dispersed polymer. Linear polymers selected as standards for comparison should be of the same viscosity average molecular weight and comonomer content. Linear character for polymer containing C2 to C10 monomers is confirmed by Carbon-13 NMR the method of Randall (Rev. Macromol. Chem. Phys., C29 (2&3), p. 285-297).

The ethylene polymers produced herein typically comprise ethylene and one or more C3 to C12 alpha-olefins, preferably propylene, butene, hexene and or octene. Ethylene polymer is defined to mean a polymer where at least 50 mol % of the polymer is ethylene.

In another embodiment, the polymers described herein comprise ethylene and up to 5 mol % of a C3 to C12 alpha-olefin comonomer (preferably propyl, butyl, pentyl, hexyl, heptyl, octyl, nonyl, decyl undecyl, dodecyl, and the isomers thereof) preferably from 0.1 to 5 mole %, preferably from 0.5 to 3 mole % (alternately from 0.1 to 4 mole %, alternately from 0.25 to 4.5 mole %). In another embodiment the polymer is a homopolymer of ethylene. In a particularly preferred embodiment the polymer comprises ethylene and up to 3 mol % of at least one comonomer selected from alpha-olefins having 3 to 12 carbon atoms, preferably propyl, butyl, pentyl, hexyl, heptyl, octyl, nonyl, decyl undecyl, dodecyl, and the isomers thereof.

In an alternate embodiment, hexene is present at up to 30 mole %, alternately up to 20 mole %.

In another embodiment, the melting range (defined as the temperature in ° C. at the end of the DSC curve minus the temperature in ° C. at the beginning of the DSC curve) is 30° C. or less, preferably 10° C. or less preferably 5° C. or less.

In another embodiment the polymers produced herein have a Brookfield viscosity at 140° C. of 100,000 mPa·sec (also referred to as mPas) or more, preferably 125,000 mPa·sec or more, preferably 150,000 mPa·sec or more, preferably 175,000 mPa·sec or more. Alternately the polymers produced herein also have a Brookfield viscosity at 140° C. of 300,000 mPa·sec or less, alternately 250,000 mPa·sec or less.

In another embodiment the polymers produced herein have a Brookfield viscosity at 177° C. of 10,000 mPa·sec (also referred to as mPas) or more, preferably 20,000 mPa·sec or more, preferably 30,000 mPa·sec or more, preferably 40,000 mPa·sec or more, preferably 50,000 mPa·sec or more. Alternately the polymers produced herein also have a Brookfield viscosity at 177° C. of 150,000 mPa·sec or less, alternately 100,000 mPa·sec or less.

Brookfield viscosity is measured using a Brookfield digital viscometer and a number 27 spindle according to ASTM D-3236 at the designated temperature.

In another embodiment the polymers produced herein have a softening point of greater than 100° C., alternately greater than 120° C. Softening point is determined according to ASTM E28.

In an alternate embodiment, the polymers produced herein have a slope that is greater than zero when mole % comonomer (y-axis) is plotted against Mw (x-axis). Alternately the slope is greater than 0.2. The Mw is between 10,000 and 40,000 g/mol.

Polymerization Process

This invention also relates to a process, preferably a heterogeneous process, to make the polymers described herein. In a preferred embodiment, ethylene and optional comonomers (such as C3 to C12 alpha-olefins) can be polymerized by reacting a catalyst system (comprising metallocene compound(s), and one or more activators) with the olefins. Other additives may also be used, as desired, such as scavengers and/or hydrogen. Any conventional gas phase suspension, homogeneous bulk, slurry, or high-pressure polymerization process can be used. Such processes can be run in a batch, semi-batch, or continuous mode. Heterogeneous polymerization processes are preferred. (A heterogeneous polymerization process is defined to be a process where at least 90 wt % of the polymer product is not soluble in the reaction media.) Preferably no solvent or diluent is present in the reaction medium, (except for the small amounts used as the carrier for the catalyst system or other additives).

Alternately, suitable diluents/solvents for polymerizations described herein include non-coordinating, inert liquids. Examples include straight and branched-chain hydrocarbons such as isobutane, butane, pentane, isopentane, hexanes, isohexane, heptane, octane, dodecane, and mixtures thereof, cyclic and alicyclic hydrocarbons such as cyclohexane, cycloheptane, methylcyclohexane, methylcycloheptane, and mixtures thereof such as can be found commercially (Isopars); perhalogenated hydrocarbons such as perfluorinated $C_{4-10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable.

In a preferred embodiment, the feed concentration for the polymerization is 60 volume % solvent or less, preferably 40 volume % or less, preferably 20 volume % or less.

Suitable additives to the polymerization process can include one or more scavengers, promoters, modifiers, reducing agents, oxidizing agents, hydrogen, aluminum alkyls, or silanes.

In a preferred embodiment hydrogen is present in the polymerization reactor at 0.001 to 10 psig, preferably from 0.01 to 5 psig, more preferably 0.1 to 2.5 psig. In another embodiment, the hydrogen is present at a hydrogen to major olefin (major olefin is defined to mean the olefin monomer present at 50 wt % or more, based on the weight of all monomers present) molar ratio of $1 \times 10^{-6}:1$ to $100 \times 10^{-6}:1$, preferably $2 \times 10^{-6}:1$ to $15 \times 10^{-6}:1$, preferably $3 \times 10^{-6}:1$ to $15 \times 10^{-6}:1$.

Polymerizations are typically run at temperatures of from 60° C. to 150° C., preferably 70° C. to 120° C., preferably 75° C. to 115° C. Polymerizations are typically run a pressures of up to 3500 kPa, preferably from 690 kPa to 2760 kPa, preferably from 1724 kPa to 2450 kPa.

In a typical polymerization, the residence time of the reaction may be up to 5 hours. Alternately the residence time may be from 15 seconds to 60 minutes, alternately from 10 to 50 minutes, preferably from 15 to 40 minutes.

After polymerization and deactivation of the catalyst, the polymer product can be recovered by processes well known in the art. Any excess reactants may be flashed off from the polymer and the polymer obtained extruded into water and cut into pellets or other suitable comminuted shapes. For general process conditions, see the general disclosure of U.S. Pat. Nos. 5,084,534, 5,408,017, 6,127,497, 6,255,410, which are incorporated herein by reference.

Gas Phase

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when higher density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the catalyst system (preferably supported) is introduced into a gas phase rector where the gas phase polymerization occurs at a temp of 70 to 105° C., a pressure of 690 to 2415 kPa, and is a continuous process preferably using a fluidized bed and a recycle stream as fluidizing medium.

In another preferred embodiment, the process to produce the polymers described herein comprises contacting ethylene and optionally at least one comonomer at a temperature of about 70° C. to about 105° C. (preferably 70° C. to 100° C.) in the gas phase with a catalyst system (as described below, preferably a catalyst system comprising a supported unbridged, substituted hafnocene and a non-coordinating anion activator), wherein said contacting is optionally conducted in the presence of hydrogen present at a ratio of 1 to $100 \times 10^{-6}$ mol of hydrogen per mole of ethylene, (preferably 3 to $15 \times 10^{-6}$ mol of hydrogen per mole of ethylene).

In another embodiment, the above process is connected in series or parallel to one or more reactors producing another polymer (such as polyethylene) to produce a blend of the polymers described herein with other polymers (such as those described below).

In another embodiment, this invention also provides for an in-reactor process for producing the polymer blends described below, the process comprising contacting ethylene and optionally at least one comonomer at a temperature of about 60° C. to about 105° C. in the gas phase with a first catalyst system comprising a supported unbridged, substituted hafnocene and a non-coordinating anion activator and with a second catalyst system that is capable of producing polymer (preferably polyethylene) having a density of at least 0.900 g/cc and an Mw of 60,000 to 500,000. Preferably the first and second polymers differ in Mw by at least 20,000 g/mol, alternately by at least 30,000 g/mol, alternately by at least 40,000 g/mol. Alternately, the first and second polymers differ in density by at least 0.10 g/cc or more, alternately by at least 0.20 g/cc or more, preferably by 0.30 g/cc or more.

In another embodiment, the second polymer has a density of at least 0.04 g/cc less than the density of the first polymer, preferably 0.1 g/cc less, preferably 0.25 less.

Alternately the first and second catalyst systems are provided in first and second reactors, respectively, connected in series or in parallel. The process may be continuous or batch or semi-batch.

Useful second catalysts include: Bis(n-propyl-Cp) hafnium dihalide or di alkyl (supported or unsupported), dimethylsilyl (tetramethyl-Cp)(t-butyl amido)Ti dihalide or dialkyl (supported or unsupported), and dimethylsilyl bis(tetrahydroindenyl)zirconium dihalide or dialkyl, (supported or unsupported), wherein the halide may be Br, Cl, or F, and the alkyl of the dialkyl is selected from methyl, ethyl, butyl, propyl, hexyl, or the dialkyl may form a cyclic ring with the metal, such as butadiene, butane, butene, and the like Catalyst Compound Catalyst compounds useful herein include one or more transition metal compounds of the formula:

$$T_n ABHfX_2$$

wherein T is a bridging group (preferably a silica containing group), n is 0 or 1, A and B are different substituted cyclopentadienyl ligands, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, provided that when n is 1, then A and B are represented by the formula: $R*_4$-Cp, where each R* is, independently, hydrogen or a $C_1$ to $C_8$ alkyl group and that at least seven R* groups are not hydrogen.

Preferred catalyst compounds useful herein include one or more metallocene compound(s) represented by the formula:

$$ABHfX_2$$

wherein A and B are different substituted cyclopentadienyl ligands, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof. A and B are unbridged.

Indene and fluorene are defined to be substituted cyclopentadienyl groups. "Different substituted cyclopentadienyl ligands" is defined to mean the substituted cyclopentadienyl groups differ by at least one substituent, e.g. either the number of substituents is different or the substituents differ in the number of atoms.

Preferred catalyst compounds useful herein include one or more metallocene compound(s) represented by the formula:

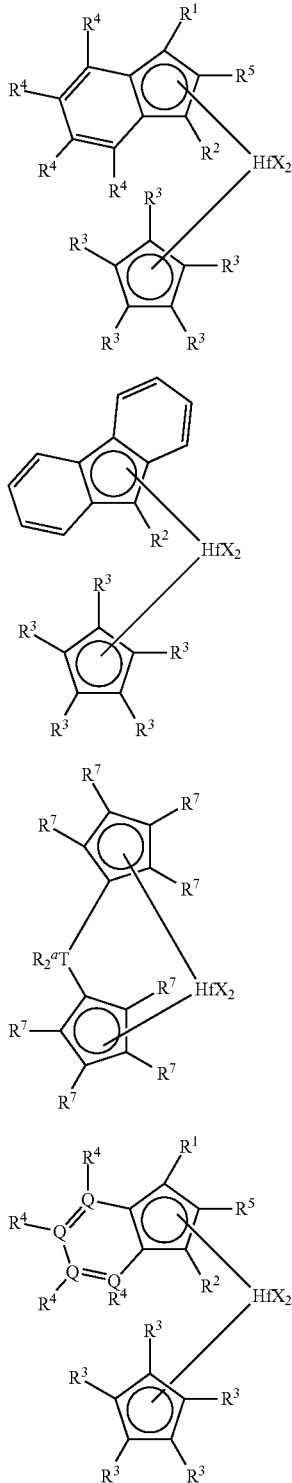

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl benzyl, chloride, bromide, iodide, (alternately two X's may form a part of a fused ring or a ring system;
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;
each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, provided that at least one of $R^1$ or $R^2$ is not hydrogen, preferably both of $R^1$ and $R^2$ are not hydrogen, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen); {Alternately, when the catalyst compound is to used to make the homopolymer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl)};
each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);
$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);
N is nitrogen;
T is Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In another embodiment, in formula (IV) adjacent $R^7$ groups in formula (IV) may not form aromatic cyclic rings.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful in this invention include one or more of:
(1,3-Dimethylindenyl)(pentamethylcyclopentadienyl) Hafniumdimethyl,
(1,3,4,7-Tetramethylindenyl)(pentamethylcyclopentadienyl) Hafniumdimethyl,
(1,3-Dimethylindenyl)(tetramethylcyclopentadienyl)Hafniumdimethyl,
(1,3-Diethylindenyl)(pentamethylcyclopentadienyl)Hafniumdimethyl,
(1,3-Dipropylindenyl)(pentamethylcyclopentadienyl)Hafniiumdimethyl,
(1-Methyl,3-propylindenyl)(pentamethylcyclopentadienyl) Hafniumdimethyl,
(1,3-Dimethylindenyl)(tetramethylpropylcyclopentadienyl) Hafniiumdimethyl,
(1,2,3-Trimethylindenyl)(pentamethylcyclopentadienyl) Hafniiumdimethyl,
(1,3-Dimethylbenzindenyl)(pentamethylcyclopentadienyl) Hafniumdimethyl,
(2,7-Bis t-butylfluorenyl)(pentamethylcyclopentadienyl) Hafniumdimethyl,
(9-Methylfluorenyl)(pentamethylcyclopentadienyl)Hafniumdimethyl,
(2,7,9-Trimethylfluorenyl)(pentamethylcyclopentadienyl) Hafniumdimethyl,
μ-Dihydrosilyl(bis tetramethylcyclopentadienyl)Hafniumdimethyl,
μ-Dihydrosilyl(bis tetramethylcyclopentadienyl)Hafniumdimethyl,
μ-Dimethylsilyl(tetramethylcyclopentadienyl)(3-propyltrimethylcyclopentadienyl) Hafniumdimethyl, and
μ-Dicyclopropylsilyl(bis tetramethylcyclopentadienyl) Hafniumdimethyl. In an alternate embodiment, the "dimethyl" after the transition metal in the list of catalyst compounds above is replaced with a dihalide (such as dichloride or difluoride) or a bisphenoxide, particularly for use with an aluminum alkyl or alumoxane alkylating agent in addition to the non-coordinating anion.

In a preferred embodiment, the catalyst compound used herein is a supported unbridged, bis-(substituted cyclopentadienyl) hafnium dihalide (preferably Br or Cl) or dialkyl (preferably C1 to C12 alkyl). The term "supported" means that the catalyst compound, either activated or as a precursor, has been adsorbed, bound to or otherwise placed on a support (such as silica). The term "unbridged" means that the cyclopentadienyl groups that are bound to the hafnium are not bound to each other. The term "hafnocene" means a hafnium atom having two cyclopentadienyl groups bonded thereto and having two anionic leaving groups (such as halide or alkyl) bonded to the hafnium. The term "substituted hafnocene" means a hafnium atom having two substituted cyclopentadienyl groups bonded thereto and having two anionic leaving groups (such as halide or alkyl) bonded to the hafnium. Preferably the leaving groups are Br, Cl, methyl, ethyl, propyl, butyl, hexyl, octyl or a combination thereof.

In another embodiment, the catalyst compound used herein is a supported, unbridged, substituted hafnocene. In a preferred embodiment the supported, unbridged, substituted hafnocene is a bis-(substituted cyclopentadienyl) hafnium complex having two cyclopentadienyl (Cp) groups that are bound to the hafnium but are not bound to each other, where the Cp rings each have at least two substitutions (preferably 3, more preferably 4, more preferably 5 substitutions on each of the Cp rings), the hafnium complex is present on a support and wherein the hafnium complex has two anionic leaving groups (such as halide or alkyl). Preferably the leaving groups are Br, Cl, methyl, ethyl, propyl, butyl, hexyl, octyl or a combination thereof. Preferably the support has been treated to remove surface hydroxyl groups, typically by calcining or by treating with a trialkylaluminum, such as triethylaluminum.

Activators and Activation Methods For Catalyst Compounds

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include ionizing activators, which may be neutral or ionic. Preferred activators include ionizing anion precursor compounds that abstract one reactive, σ-bound, metal ligand making the metal complex cationic and providing a charge-balancing noncoordinating or weakly coordinating anion.

Useful scavengers include alumoxane compounds, modified alumoxane compounds typically present at ratios of 10:1 or less (Al to catalyst metal molar ratio). Aluminum alkyl or organoaluminum compounds which may be utilized as co-activators (or scavengers) include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronapthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators. Preferred activators include the ionic activators. In alternate embodiment, the activator is not a neutral borane.

Examples of neutral stoichiometric activators include tri-substituted boron, tellurium, aluminum, gallium and indium or mixtures thereof. The three substituent groups are each independently selected from alkyls, alkenyls, halogens, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \quad (14)$$

wherein L is an neutral Lewis base; H is hydrogen; $(L-H)^+$ is a Bronsted acid; $A^{d-}$ is a non-coordinating anion having the charge d−; and d is an integer from 1 to 3.

The cation component, $(L-H)_d^+$ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, syliliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene, and mixtures thereof.

The anion component $A^{d-}$ include those having the formula  $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activator in the catalyst systems of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium) tetrakis (pentafluorophenyl)borate, tropillium tetrakis (pentafluorophenyl)borate, triphenylcarbenium tetrakis (pentafluorophenyl)borate, triphenylphosphonium tetrakis (pentafluorophenyl)borate, triethylsilylium tetrakis (pentafluorophenyl)borate, benzene(diazonium) tetrakis (pentafluorophenyl)borate, trimethylammonium tetrakis-(2, 3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3, 4,6-tetrafluorophenyl)borate, N,N-dimethyl-(2,4,6-trimethylanilinium) tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis (perfluoronapthyl)borate, triethylammonium tetrakis (perfluoronapthyl)borate, tripropylammonium tetrakis (perfluoronapthyl)borate, tri(n-butyl)ammonium tetrakis (perfluoronapthyl)borate, tri(t-butyl)ammonium tetrakis (perfluoronapthyl)borate, N,N-dimethylanilinium tetrakis (perfluoronapthyl)borate, N,N-diethylanilinium tetrakis (perfluoronapthyl)borate, N,N-dimethyl-(2,4,6-trimethylanilinium) tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium) tetrakis (perfluoronapthyl)borate, trimethylammonium tetrakis (perfluorobiphenyl)borate, triethylammonium tetrakis (perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium) tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $(L-H)_d^+$ $(A^{d-})$ is, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. In addition to these activator compounds or co-catalysts, scavengers are used such as tri-isobutyl aluminum or tri-octyl aluminum.

Another suitable ion forming, activating cocatalyst comprises a salt of a cationic oxidizing agent and a noncoordinating, compatible anion represented by the formula:

$$(OX^{e+})_d(A^{d-})_e$$

wherein $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

The typical NCA activator-to-catalyst-precursor ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

In a preferred embodiment, the polymerization is conducted in the absence of alumoxane. Alternately 200 ppm or less alumoxane is present in the polymerization reactor, preferably 100 ppm or less, preferably 10 ppm or less. Alternately alumoxane is present in the polymerization at molar ratio of Al to catalyst metal of 10:1 or less, preferably 5:1 or less, preferably 1:1 or less.

In another embodiment, the catalysts described herein are used in combination with the activators described in U.S. Ser. No. 12/184,713, filed Aug. 1, 2008, i.e. with an activator having the formula (1):

$$[R^1R^2R^3AH]^+[Y]^-, \qquad (1)$$

wherein $[Y]^-$ is a non-coordinating anion* (as defined in U.S. Ser. No. 12/184,713), A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system.

Activator Combinations

It within the scope of this invention that catalyst compounds can be combined with one or more activators or activation methods described above. In another embodiment diethyl zinc is combined with one or more catalysts as a chain shuttling agent.

Supports

The catalyst compounds and activators described above are preferably placed upon a support by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously.

By one method, the activator and or catalyst precursor, dissolved in an appropriate solvent such as toluene, may be stirred with the support material for 1 minute to 10 hours. The total solution volume may be greater than the pore volume of the support, but some embodiments limit the total solution volume below that needed to form a gel or slurry (about 90% to 400%, preferably about 100% to 200% of the pore volume). The mixture is optionally heated from 30° C. to 200° C. during this time. The catalyst precursor may be added to this mixture as a solid, if a suitable solvent is employed in the previous step, or as a solution. Additionally, two or more different catalyst precursors may be placed on the same support using any of the support methods disclosed above. Likewise, two or more activators or an activator and co-activator may be placed on the same support.

Suitable solid particle supports useful herein are typically comprised of polymeric or refractory oxide materials, each being preferably porous. Any support material that has an average particle size greater than 10 µm is suitable for use in this invention, such as for example, talc, inorganic oxides (silica), inorganic chlorides, for example magnesium chloride and resinous support materials such as polystyrene polyolefin or polymeric compounds or any other organic support material and the like. Preferred catalyst support materials include silica, alumina, silica-alumina, and their mixtures. Other inorganic oxides (such as magnesia, titania, zirconia, and the like) may be added to the silica, alumina, or silica-alumina. Lewis acidic materials such as montmorillonite and similar clays may also serve as a support. In this case, the support can optionally double as the activator component, however additional activator may also be used.

The support material may be pretreated by any number of methods. For example, inorganic oxides may be calcined, chemically treated with dehydroxylating agents such as aluminum alkyls and the like, or both.

Useful supports preferably have a surface area of from 10-700 m$^2$/g, a pore volume of 0.1-4.0 cc/g and an average particle size of 10-500 µm. Some embodiments select a surface area of 50-500 m$^2$/g, a pore volume of 0.5-3.5 cc/g, or an average particle size of 20-200 µm. Other embodiments select a surface area of 100-400 m$^2$/g, a pore volume of 0.8-3.0 cc/g, and an average particle size of 30-100 µm. Preferred embodiments typically have a pore size of 10-1000 Angstroms, alternatively 50-500 Angstroms, or 75-350 Angstroms.

Catalyst precursors are generally deposited on the support at a loading level of 10-100 micromoles of catalyst precursor per gram of solid support; alternately 20-80 micromoles of catalyst precursor per gram of solid support; or 40-60 micromoles of catalyst precursor per gram of support.

In a particularly preferred embodiment, the support (preferably silica) has been treated with an alkyl aluminum compound. Preferably the alkyl aluminum compound is present on the support at from 0.1 to 10 wt % based upon the weight of the support, preferably at from 1 to 10 wt %. Preferred alkyl aluminum compounds are represented by the formula: AlR$_3$, where R is a C1 to C40 alkyl group, preferably methyl, ethyl, propyl (including isopropyl), butyl (including n-butyl, isobutyl, sec butyl), hexyl, octyl (including n-octyl), and the like. Preferred alkyl aluminum compounds include trimethyl aluminum, triethyl aluminum, tripropyl aluminum, tri-n-butyl aluminum, tri-n-octyl aluminum and mixtures thereof.

Polymer Uses

The ethylene polymers produced herein may be used alone or in blends with other polymers to produce films (including liners), molded articles (including injection molded articles).

The polymers produced herein are particularly useful in blends with other polymers (such as LLDPE, etc) in forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

Preferably the polymers produced herein may be used as blend components. Preferably any of the polymers produced herein may be blended with up to 50 wt % (preferably from 1 to 40 wt %, preferably from 5 to 30 wt %) of a polymer (preferably a ethylene polymer, preferably a homopolyethylene) having an Mw as measured by gel permeation chromatography of at least 60,000 g/mol, preferably at least 100,000 g/mol, preferably at least 150,000 g/mol.

Preferably the polymers produced herein are blended with polymers (preferably ethylene polymers) having a density (ASTM D-1505) of 0.965 g/cc or more, preferably 0.94 g/cc or more, preferably from 0.935 to 0.96 g/cc.

In a preferred embodiment, the blend of the polymers produced herein with ethylene polymer having density of 0.90 g/cc or more and an Mw of 40,000 to 500,000 has an ESCR (environmental stress crack resistance) of at least 200 hours, preferably at least 500 hours, preferably at least 750 hours, preferably at least 1000 hours and an notched Izod impact strength of 120 J/m, for a 3.17 mm sample at −40° C. Environmental Stress Crack Resistance (ESCR) (bent strip) is determined in accordance with ASTM D 1693-F50. Notched Izod impact strength is measured by ASTM D-256, Method A.

In another embodiment, this invention relates to:
1. An ethylene polymer comprising ethylene and from 0 to 5 mole % of at least one comonomer, wherein the ethylene polymer has an Mw from 10,000 to 50,000 g/mol, an Mw/Mn of 1.5 to 4.5, a density of at least 0.925 g/cc or more, an unsaturation level of less than 1 per 1000 carbon atoms, a Tm of at least 120° C., a Tc of greater than Z° C., where Z=0.501×(density in kg/m$^3$)−367, and a Brookfield viscosity at 140° C. of 100,000 mPas or more.
2. The polymer of paragraph 1 wherein the polymer comprises up to 3 mol % of at least one alpha-olefin comonomer having 3 to about 12 carbon atoms.
3. The polymer of paragraph 1 or 2 wherein the polymer has an Mw of 20,000 to 40,000 g/mol.
4. The polymer of paragraph 1, 2 or 3 wherein the polymer has an Mw/Mn of about 2 to about 3.5.
5. The polymer of any of paragraphs 1 to 4 wherein the polymer has a density of at least 0.930 g/cc.
6. The polymer of any of paragraphs 1 to 5 wherein the polymer has a melting point of at least 125° C.
7. The polymer of any of paragraphs 1 to 6 wherein the polymer has a branching index g' of at least 0.95.
8. A blend of at least first and second polymers, wherein the first polymer comprises the ethylene polymer of any of paragraphs 1 to 7 and the second polymer has an Mw of at least 40,000 g/mol.
9. The blend of paragraph 8 wherein said second polymer has an Mw of at least 100,000 g/mol.
10. The blend of paragraph 8 or 9 wherein said second polymer has a density of 0.92 g/cc or less.

11. The blend of paragraph 8, 9 or 10 wherein said second polymer has a density of at least 0.04 g/cc less than the density of the first polymer.

12. A process to produce ethylene polymer (preferably the ethylene polymer of any of paragraphs 1 to 7) comprising:
   1) contacting ethylene and optionally at least one comonomer at a temperature of about 60° C. to about 105° C. in the gas phase, in the presence of from 0 to $100 \times 10^{-6}$ mols of hydrogen per mole of ethylene, with a catalyst system comprising a support, a non-coordinating anion activator and a transition metal compound of the formula: $T_nABHfX_2$ wherein T is a bridging group, n is 0 or 1, A and B are different substituted cyclopentadienyl ligands, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, provided that when n is 1, then A and B are represented by the formula: $R^*_4$-Cp, where each R* is, independently, hydrogen or a $C_1$ to $C_8$ alkyl groups and that at least seven R* groups are not hydrogen;
   2) obtaining a polymer comprising ethylene and from 0 to 5 mole % of at least one comonomer, wherein the polymer has an Mw from 10,000 to 50,000 g/mol, an Mw/Mn of 1.5 to 4.5, a density of at least 0.925 g/cc or more, an unsaturation level of less than 1 per 1000 carbon atoms, a Tm of at least 120° C., a Tc of greater than Z° C., where Z=0.501×(density (in g/cc)×1000)−367, and a Brookfield viscosity at 140° C. of 100,000 mPas or more.

13. The process of paragraph 12, wherein said contacting is conducted in the presence of hydrogen present at a ratio of $2 \times 10^{-6}$ to $15 \times 10^{-6}$ moles of hydrogen per mole of ethylene.

14. The process of paragraph 12 or 13, wherein said contacting is conducted at a temperature of about 70° C. to about 100° C.

15. The process of paragraph 12, 13 or 14 wherein said transition metal compound is supported on a support that has been calcined at 600° C. for at least 5 minutes.

16. The process of paragraph 12, 13, 14 or 15 wherein the transition metal compound is supported on silica which has been treated with an alkylaluminum compound.

17. The process of any of paragraphs 12 to 16, wherein said transition metal compound is represented by the formula: $ABHfX_2$ wherein A and B are different substituted cyclopentadienyl ligands that are not bridged, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof.

18. The process of any of paragraphs 12 to 16, wherein said transition metal compound is represented by the formula (I), (II), or (IV) depicted above, where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each Q is, independently carbon or a heteroatom, provided that at least one Q is a heteroatom;
each $R^1$ is, independently, hydrogen or a $C_1$ to $C_8$ alkyl group;
each $R^2$ is, independently, hydrogen or a $C_1$ to $C_8$ alkyl group;
each $R^3$ is, independently, hydrogen, or a substituted or unsubstituted hydrocarbyl group having from 1 to 8 carbon atoms, provided however that at least three $R^3$ groups are not hydrogen;
each $R^4$ is, independently, hydrogen or a substituted or unsubstituted hydrocarbyl group, a heteroatom or heteroatom containing group;
$R^5$ is hydrogen or a $C_1$ to $C_8$ alkyl group;
$R^6$ is hydrogen or a $C_1$ to $C_8$ alkyl group;
each $R^7$ is, independently, hydrogen or a $C_1$ to $C_8$ alkyl group;
provided that any two adjacent R groups may form a fused ring or multicenter fused ring system where the rings may be aromatic, partially saturated or saturated.

19. The process of any of paragraphs 12 to 16, wherein said transition metal compound is represented by formula IV depicted above, wherein
Hf is hafnium; T is Si or Ge;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^7$ is, independently, hydrogen, or a $C_1$ to $C_8$ alkyl group provided however that at least seven $R^7$ groups are not hydrogen; and
each $R^a$, is independently, hydrogen, halogen or a C1 to C20 hydrocarbyl, and two $R^a$ can form a cyclic structure including aromatic, partially saturated, or saturated cyclic or fused ring system.

20. The process of any of paragraphs 12 to 19, wherein said transition metal compound is selected from:
(1,3-Dimethylindenyl)(pentamethylcyclopentadienyl)hafniumdimethyl,
(1,3,4,7-Tetramethylindenyl)(pentamethylcyclopentadienyl) hafniumdimethyl,
(1,3-Dimethylindenyl)(tetramethylcyclopentadienyl)hafniumdimethyl,
(1,3-Diethylindenyl)(pentamethylcyclopentadienyl)hafniumdimethyl,
(1,3-Dipropylindenyl)(pentamethylcyclopentadienyl)hafniumdimethyl,
(1-Methyl,3-propyllindenyl)(pentamethylcyclopentadienyl) hafniumdimethyl,
(1,3-Dimethylindenyl)(tetramethylpropylcyclopentadienyl) hafniumdimethyl,
(1,2,3-Trimethylindenyl)(pentamethylcyclopentadienyl) hafniumdimethyl,
(1,3-Dimethylbenzindenyl)(pentamethylcyclopentadienyl) hafniumdimethyl,
(2,7-Bis t-butylfluorenyl)(pentamethylcyclopentadienyl) hafniumdimethyl,
(9-Methylfluorenyl)(pentamethylcyclopentadienyl)hafniumdimethyl, and
(2,7,9-Trimethylfluorenyl)(pentamethylcyclopentadienyl) hafniumdimethyl.

21. The process of any of paragraphs 12 to 19, wherein said activator is a fluorinated aryl borate.

22. An in-reactor process for producing the polymer blend of any of paragraphs 8 to 11, the process comprising contacting ethylene and optionally at least one comonomer at a temperature of about 60° C. to about 105° C. in the gas phase with a first catalyst system comprising a hafnocene and a non-coordinating anion activator and with a second catalyst system capable of producing ethylene polymer having a density of at least 0.900 g/cc and an Mw of 40,000 to 500,000 g/mol, wherein the hafnocene is represented by formula (I), (II), (III), or (IV) depicted above, wherein:

Hf is hafnium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each Q is, independently carbon or a heteroatom, provided that at least one Q is a heteroatom;

each $R^1$ is, independently, hydrogen or a $C_1$ to $C_8$ alkyl group;

each $R^2$ is, independently, hydrogen or a $C_1$ to $C_8$ alkyl group;

each $R^3$ is, independently, hydrogen, or a substituted or unsubstituted hydrocarbyl group having from 1 to 8 carbon atoms, provided however that at least three $R^3$ groups are not hydrogen;

each $R^4$ is, independently, hydrogen or a substituted or unsubstituted hydrocarbyl group, a heteroatom or heteroatom containing group;

$R^5$ is hydrogen or a $C_1$ to $C_8$ alkyl group;

$R^6$ is hydrogen or a $C_1$ to $C_8$ alkyl group;

each $R^7$ is, independently, hydrogen, or a $C_1$ to $C_8$ alkyl group;

provided that any two adjacent R groups may form a fused ring or multicenter fused ring system where the rings may be aromatic, partially saturated or saturated;

T is Si or Ge; and each $R^a$, is independently, hydrogen, halogen or a C1 to C20 hydrocarbyl, and two $R^a$ can form a cyclic structure including aromatic, partially saturated, or saturated cyclic or fused ring system, and provided however that in formula (IV) at least seven $R^7$ groups are not hydrogen and adjacent $R^7$ groups in formula (IV) may not form aromatic cyclic rings.

23. The process of paragraph 22, wherein said first and second catalyst systems are provided in first and second reactors, respectively, connected in series.

24. A film produced from the polymer blend of paragraphs 8 to 11 or the blend produced by paragraph 22 or 23.

25. An injection molded article produced from the polymer blend of paragraphs 8 to 11 or the blend produced by paragraph 22 or 23.

EXAMPLES

Tests and Materials

Melt index (MI) and high load melt index (HLMI) were determined according to ASTM 1238 (190° C., 2.16 or 21.6 kg, respectively). In the event a weight is not specified as part of a melt index, it is assumed that 2.16 kg was used.

Density was determined using chips cut from plaques compression molded in accordance with ASTM D-4703-07 and aged for 40 hrs at 23° C. plus or minus 2° C. and measured as specified by ASTM D-1505, unless otherwise stated.

To determine bulk density, the polymer particles are poured via a ⅞" diameter funnel into a fixed volume cylinder of 400 cc. The bulk density is measured as the weight of resin divided by 400 cc to give a value in g/cc.

Molecular weights [number average molecular weight (Mn), weight average molecular weight (Mw), and z average (Mz)] and molecular weight distributions (Mw/Mz or Mw/Mn) were determined using a Waters 2000 Gel Permeation Chromatograph (GPC) equipped with a differential refractive index (DRI) detector and calibrated with polystyrene standards. The polymer samples were dissolved in 1,2,4-trichlorobenzene at 140° C. to 160° C. for 1-3 hrs in a shaker oven. The solution was then filtered through 2 micron stainless steel filter from Polymer Labs into scintillation vials and then analyzed on the Waters 2000 GPC instrument. The column was a Polymers Lab mixed B column with polystyrene/DVB beads and the run temperature was 145° C. The molecular weight data are reported in g/mol, unless otherwise noted.

CDBI was measured by the following crystallization analysis fractionation (CRYSTAF) method using a CRYSTAF 200 unit commercially available from PolymerChar, Valencia, Spain using the provided CRYSTAF Software program (Version 2001.b, PolymerChar, Valencia, Spain). Specifically, the polymer samples were dissolved in 1,2-dichlorobenzene at 160° C. (0.66 mg/mL) for 1 hour and stabilized at 100° C. for 45 minutes. The sampling temperatures ranged from 100° C. to 30° C. at a cooling rate of 0.2° C./min. An infrared detector was used to measure the polymer solution concentrations. The cumulative soluble concentration was measured as the polymer crystallizes while the temperature is decreased. The CRYSTAF parameters are identified by the peak analysis module included in the CRYSTAF Software (Version 200Lb, PolymerChar, Valencia, Spain). To calculate the CRYSTAF curve, the processing parameters were: temperature limit=70° C. and smoothing parameters above the temperature limit of 0.1, and below the temperature limit of 0.3. Tw=weight average temperature ($\Sigma[Ci]*Ti)/(\Sigma[Ci])$, and Tn=number average temperature ($\Sigma[Ci])/((\Sigma[Ci])/Ti)$, wherein Ci=concentration and T=temperature in ° C. Tw and Tn are calculated by the CRYSTAF software (Version 2001.b).

Brookfield viscosity was measured according to ASTM D 3236 at 140° C. and 177° C.

Peak melting point (Tm) and peak crystallization temperature (Tc), glass transition temperature (Tg), and heat of fusion (H) were determined using the following procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 5 minutes then cooled down to −90° C. at a rate of 10° C./minute, followed by an isothermal for 5 minutes at −90° C. and heating to 200° C. at a rate of 10° C./minute. Both the first and second cycle thermal events were recorded. Areas under the endothermic peaks were measured and used to determine the heat of fusion. The melting and crystallization temperatures reported here were obtained during the first cooling and second heating cycle. Softening point (Ring and Ball) was measured according to ASTM E-28.

Total Unsaturations (vinylenes, trisubstituted olefins, vinyls, vinylidenes) were measured by $^1$H NMR. Data was collected at 120° C. in a 5 mm probe using a Varian spectrometer with a $^1$Hydrogen frequency of at least 400 MHz. Data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Catalyst Preparation

All Synthetic procedures were performed in an inert atmosphere dry box following common protocol in obtaining air-sensitive materials. MAO as a 30 wt % solution and triphenylcarbenium tetrakis(pentafluorophenyl)borate were purchased from Albemarle.

[Li][1,3-Me$_2$C$_9$H$_5$]

LiC$_9$H$_7$ was generated in Et$_2$O (−35° C.) by the reaction of 29 g indene (0.25 mol) with 1 equivalent of n-BuLi (10 M, hexane) added slowly. LiC$_9$H$_7$ was isolated by reduction of the ether solution, addition of hexane and filtration over a medium glass frit. The product was washed with additional hexane (2×40 mL). LiC$_9$H$_7$ was dissolved in Et$_2$O, cooled to −35° C. and reacted with excess MeI (0.375 mol, 47.6 g). After 2 hrs the reaction mixture was warmed to ambient temperature. 1-MeC$_9$H$_7$ was isolated as a colorless liquid by aqueous work-up and ether extractions. Similarly 1,3-Me$_2$C$_9$H$_6$ was synthesized by lithiation of MeC$_9$H$_7$, methylation with MeI and aqueous work-up. [Li][1,3-Me$_2$C$_9$H$_5$] was synthesized by reaction of 1,3-Me$_2$C$_9$H$_6$ in hexane with excess nBuLi (1.1 equiv) for 12 hours. The white solid was filtered and washed with additional hexane and dried in vacuo to yield pure [Li][1,3-Me$_2$C$_9$H$_5$], (14.5 g). $^1$H NMR (THF-d$_8$, 300 MHz) δ ppm; 7.25-7.10 (m, C$_6$H$_4$, 2H), 6.45-6.30, C$_6$H$_4$, 2H), 6.10 (s, 2-indenyl proton, 1H), 2.35 (s, 1,3Me$_2$C$_9$H$_5$, 6H).

(CpMe$_4$)(1,3-Me$_2$C$_9$H$_5$)HfMe$_2$

HfCl$_4$ (31 g) was slurried in CH$_2$Cl$_2$ (200 mL) and reacted slowly with CpMe$_4$HSiMe$_3$ for several hours. The reaction mixture was filtered, reduced in volume and hexane (80 mL) was added. The filtrate was cooled to −35° C. The off-white product was collected and dried in vacuo. (CpMe$_4$H)HfCl$_3$ (8.0 g) was dissolved in Et$_2$O (150 mL) and reacted with [Li][1,3-Me$_2$C$_9$H$_5$] (2.8 g). After 1 hour the volatiles were removed and the crude reaction mixture extracted with CH$_2$Cl$_2$ (2×60 mL). The filtrate was reduced in vacuo to a light yellow solid product (7.2 g). All (CpMe$_4$)(1,3-Me$_2$C$_9$H$_5$)HfCl$_2$ (7.2 g) was slurried in toluene (200 mL) and reacted with 2 equivalents of MeMgBr (3 M in Et$_2$O). The reaction mixture was heated to 90° C. for 6 hours. The mixture was cooled to room temperature and dimethoxyethane (3 ml) was added. The volatiles were removed, the residue extracted with CH$_2$Cl$_2$ and the filtrates were reduced in vacuo. The product was collected after cooling to −35° C. (2.85 g). (CpMe$_4$)(1,3-Me$_2$C$_9$H$_5$)HfMe$_2$ $^1$H NMR (CD$_2$Cl$_2$, 500 MHz) δ ppm; 7.35, 7.06 (m, C$_9$H$_5$), 5.50 (s, C$_9$H$_5$), 4.89 (s, CpMe$_4$H), 2.18 (s, Me$_2$C$_9$H$_5$), 1.79, 1.76 (s, CpMe$_4$H), −1.49 HfMe.

(CpMe$_4$)(1,3-Me$_2$C$_9$H$_5$)ZrMe$_2$

ZrCl$_4$ (36 g) was slurried in CH$_2$Cl$_2$ (200 mL) and then reacted with Me$_2$S (19.2 g) for 1 hour. CpMe$_4$HSiMe$_3$ (34 g) was added slowly to the reaction mixture. Yellow solid began to precipitate after several hours and was filtered to yield a first crop of 21.3 g lt yellow solid product. (CpMe$_4$H)ZrCl$_3$.(SMe$_2$)$_x$ $^1$H NMR (CD$_2$Cl$_2$, 300 MHz) δ ppm: 6.05 (s, CpMe$_4$H), 2.6 (br s, MeS), 2.27 (s, CpMe$_4$), 2.20 (s, CpMe$_4$).

(CpMe$_4$H)ZrCl$_3$ (15.0 g) was slurried in Et$_2$O (250 mL) and reacted with [Li][1,3-Me$_2$C$_9$H$_5$] (7.5 g) for 16 h. The reaction product was filtered over a glass frit, washed with CH$_2$Cl$_2$ and dried in vacuo. All the solid product (ca 22 g) was slurried in Et$_2$O (200 mL) and reacted with MeMgI (38 g 3 M in Et$_2$O). After 4 hours dimethoxyethane (6.8 g) was added and the reaction mixture filtered. Additional Et$_2$O was used to extract the solid residue. The filtrates were reduced and cooled to −35° C. An off-white solid product was filtered and dried in vacuo (14.8 g). (CpMe$_4$)(1,3-Me$_2$C$_9$H$_5$)ZrMe$_2$.

$^1$H NMR (CD$_2$Cl$_2$, 500 MHz) δ ppm; 7.35, 7.05 (m, C$_9$H$_5$), 5.51 (s, C$_9$H$_5$), 4.83 (s, CpMe$_4$H), 2.17 (s, Me$_2$C$_9$H$_5$), 1.79, 1.70 (s, CpMe$_4$H), −1.31 ZrMe.

Catalyst A.

Silica gel (58 g) Ineos ES-757 calcined at 600° C. was slurried in toluene (250 mL) and reacted with triethylaluminum (34 g, 1.9 M in toluene) for 3 hours at room temperature. The silica was filtered and washed with hexane (2×20 mL). The treated silica was reslurried in toluene (200 mL) and reacted with triphenylcarbenium tetrakis(pentafluorophenyl) borate (2.0 g) for 10 minutes. (CpMe$_4$)(1,3-Me$_2$C$_9$H$_5$)HfMe$_2$ (1.09 g) was added and the reaction stirred for 3 hours. The supported catalyst was filtered, washed with hexane (200 mL) and dried in vacuo to yield a free flowing light pink solid.

Catalyst B.

Silica gel (58 g) Ineos ES-757 calcined at 600° C. was slurried in toluene (250 mL) and reacted with triethylaluminum (35 g, 1.9 M in toluene) for 3 hours at room temperature. The silica was filtered and washed with hexane (2×20 mL). The treated silica was reslurried in toluene (200 mL) and reacted with triphenylcarbenium tetrakis(pentafluorophenyl) borate (2.0 g) for 10 minutes. (CpMe$_4$)(1,3-Me$_2$C$_9$H$_5$)ZrMe$_2$ (0.94 g) was added and the reaction stirred overnight. The supported catalyst was filtered, washed with hexane (200 mL) and dried in vacuo to yield a free flowing light peach solid.

Catalyst C

Silica gel (51 g) Ineos ES-757 calcined at 600° C. was slurried in toluene (250 mL) and reacted with MAO (30 wt %, in toluene). The reaction was heated to 90° C. for 2 hours. The reaction was cooled to room temperature and reacted with (CpMe$_4$)(1,3-Me$_2$C$_9$H$_5$)HfMe$_2$ (1.41 g) for 2 hours. The supported catalyst was filtered and dried in vacuo to yield a free flowing light yellow solid.

Continuous Gas Phase Polymerization:

The supported catalysts were transferred into metal bombs with swagelock adaptors for connection to the catalyst feeding system. The catalysts were screened in a fluidized bed reactor equipped with devices for temperature control, catalyst feeding or injection equipment, GC analyzer for monitoring and controlling monomer and gas feeds and equipment for polymer sampling and collecting. The reactor was a 6 inch (15.2 cm) diameter bed section increasing to 10 inches (25.3 cm) at the reactor top. Gas (including ethylene monomer and hexene comonomer) was introduced through a perforated distributor plate allowing fluidization of the bed contents and polymer sample is discharged at the reactor top and collected for analysis. Reaction temperature was 80° C. Reaction conditions and characterization data are reported in Tables 1, 2, and 3 below.

TABLE 1

| | Example | | | |
|---|---|---|---|---|
| | 1 | 2 | 3 | 4 |
| Catalyst | Catalyst A | Catalyst A | Catalyst A | Catalyst A |
| PROCESS DATA | | | | |
| Hydrogen conc. (molppm) | 278 | 174 | 275 | 63 |
| Hydrogen flow (sccm) | 16.10 | 14.83 | 24.24 | 5.49 |
| Hexene conc. (mol %) | 0.523 | 0.351 | 0.168 | 0.169 |
| Ethylene conc. (mol %) | 33.9 | 35.0 | 34.9 | 35.0 |
| Comonomer/ethylene Flow Ratio | 0.112 | 0.058 | 0.027 | 0.027 |

TABLE 1-continued

|  | Example | | | |
|---|---|---|---|---|
|  | 1 | 2 | 3 | 4 |
| Ethylene flow (g/hr) | 656 | 636 | 514 | 579 |
| hydrogen/ethylene Ratio | 8.2 | 5.0 | 7.9 | 1.8 |
| Comonomer/ethylene Ratio | 0.015 | 0.010 | 0.005 | 0.005 |
| Avg. Bedweight (g) | 1887 | 1916 | 1875 | 1919 |
| Production (g/hr) | 582 | 485 | 409 | 469 |
| Residence Time (hr) | 3.2 | 3.9 | 4.6 | 4.1 |
| C2 Utilization (gC2/gC2 poly) | 1.13 | 1.31 | 1.26 | 1.24 |
| Catalyst Feed (g/hr) | 0.302 | 0.694 | 0.680 | 0.759 |
| Cat Prod. (g/g) - MB (new = .249) | 1346 | 487 | 419 | 430 |
| Product Data |  |  |  |  |
| Melt Index (MI)(I2) (dg/min) | 695.00 | 517.98 | 832.00 | 7.38 |
| HLMI (I21) dg/min | n/a | n/a | n/a | 182.80 |
| HLMI/MI Ratio (I21/I2) | n/a | n/a | n/a | 24.77 |
| Density (g/cc) | 0.9270 | 0.9384 | 0.9492 | 0.9430 |
| Bulk Density (g/cc) | 0.3675 | n/a | 0.3960 | 0.4380 |
| Mw (g/mol) | 25951 | 34,032 | 29,042 | 69,574 |
| Mn (g/mol) | 8010 | 8598 | 7860 | 14,988 |
| Mz (g/mol) | 60343 | 76,568 | 63,051 | 168,296 |
| Mw/Mn | 3.24 | 3.96 | 3.69 | 5 |
| Mz/Mw | 2.33 | 2.27 | 2.17 | 2.44 |
| Brookfield Visc. (140° C./mPa · s) | 172,000 |  | 196,000 |  |
| Brookfield Visc. (177° C./mPa · s) | 45,800 |  |  |  |
| Melting Point (° C.) |  |  | 127 |  |
| Crystallization temperature (° C.) |  |  | 113 |  |
| Softening Point (° C.) | 126 |  | 136.2 |  |
| Vinylenes (%) | 0.17 | 0.16 | 0.14 | 0.16 |
| Trisub olefins (%) | 0.41 | 0.11 | 0.06 | 0.10 |
| Vinyls (%) | 0.08 | 0.06 | 0.08 | 0.09 |
| Vinylidenes (%) | 0.61 | 0.23 | 0.17 | 0.19 |
| Total Unsaturations (%) | 1.27 | 0.56 | 0.45 | 0.54 |
| Total Production (grams) | 9318 | 6796 | 8180 | 9380 |
| Number of Bedturnovers | 4.9 | 3.5 | 4.4 | 4.9 |

TABLE 2

|  | Example | | | |
|---|---|---|---|---|
|  | 5 | 6 | 7 | 8 |
| Catalyst | Catalyst B | Catalyst B | Catalyst B | Catalyst B |
| PROCESS DATA |  |  |  |  |
| H2 conc. (molppm) | 173 | 278 | 283 | 73 |
| Hydrogen flow (sccm) | 10.97 | 24.30 | 14.06 | 6.60 |
| Hexene conc. (mol %) | 0.375 | 0.170 | 0.576 | 0.213 |
| ethylene conc. (mol %) | 35.0 | 35.0 | 35.1 | 35.0 |
| Comonomer/C2 Flow Ratio | 0.035 | 0.02 | 0.054 | 0.017 |
| ethylene flow (g/hr) | 348 | 431 | 418 | 388 |
| hydrogen/ethylene Ratio | 4.9 | 8.0 | 8.1 | 2.1 |
| Comonomer/ethylene Ratio | 0.011 | 0.005 | 0.016 | 0.006 |
| Avg. Bedweight (g) | 1810 | 1900 | 1905 | 1855 |
| Production (g/hr) | 223 | 260 | 306 | 229 |
| Residence Time (hr) | 8.1 | 7.3 | 6.2 | 8.1 |
| C2 Utilization (gC2/gC2 poly) | 1.56 | 1.66 | 1.37 | 1.70 |
| Catalyst Feed (g/hr) | 1.017 | 1.014 | 0.829 | 1.041 |
| Cat Prod. (g/g) - MB (new = .249) | 153 | 179 | 257 | 153 |
| Product Data |  |  |  |  |
| comonomer content (wt %) |  |  |  |  |
| Melt Index (MI)(I2) (dg/min) | 23.71 | 540.00 | 116.73 | 5.58 |
| HLMI(I21) dg/min | 403.08 | n/a | n/a | 115.83 |
| HLMI/MI Ratio (I21/I2) | 17.00 | n/a | n/a | 20.76 |
| Density (g/cc) | 0.9515 | 0.9594 | 0.9466 | 0.9550 |
| Bulk Density (g/cc) | 0.3910 | 0.4103 | n/a | n/a |
| Mw (g/mol) | 38680 | 29,427 | 27,474 | 64,965 |
| Mn (g/mol) | 7074 | 5898 | 5985 | 15,197 |
| Mz (g/mol) | 88611 | 63640 | 56203 | 134,637 |
| Mw/Mn | 5.47 | 4.99 | 4.59 | 4 |
| Mz/Mw | 2.32 | 2.17 | 2.04 | 2.08 |
| Brookfield Visc. (140° C./mPa · s) |  | 350000 | 314000 |  |
| Brookfield Visc. (177° C./mPa · s) |  | 187000 | 105000 |  |
| Melting Point (° C.) |  | 128 | 124 |  |

TABLE 2-continued

| | Example | | | |
|---|---|---|---|---|
| | 5 | 6 | 7 | 8 |
| Crystallization temperature (° C.) | | 116 | 113 | |
| Softening Point (° C.) | | 138.6 | 135.6 | |
| Vinylenes (%) | 0.11 | 0.14 | 0.07 | 0.14 |
| Trisub olefins (%) | 0.23 | 0.19 | 0.33 | 0.10 |
| Vinyls (%) | 0.13 | 0.13 | 0.06 | 0.14 |
| Vinylidenes (%) | 0.25 | 0.23 | 0.39 | 0.10 |
| Total Unsaturations (%) | 0.72 | 0.69 | 0.85 | 0.48 |
| Total Production (grams) | 5797 | 5725 | 7946 | 6397 |
| Number of Bedturnovers | 3.2 | 3.0 | 4.2 | 3.4 |

TABLE 3

| | Example | |
|---|---|---|
| | 9 | 10 |
| Catalyst | Catalyst C | Catalyst C |
| PROCESS DATA | | |
| Hydrogen conc. (molppm) | 671 | 10 |
| Hydrogen flow (sccm) | 91.54 | 0.00 |
| Comonomer conc. (mol %) | 0.000 | 0.000 |
| ethylene conc. (mol %) | 50.9 | 56.8 |
| ethylene flow (g/hr) | 603 | 826 |
| hydrogen/ethylene Ratio | 13.2 | 0.2 |
| Avg. Bedweight (g) | 1895 | 1916 |
| Production (g/hr) | 219 | 310 |
| Residence Time (hr) | 8.7 | 6.2 |
| C2 Utilization (gC2/gC2 poly) | 2.75 | 2.67 |
| Catalyst Feed (g/hr) | 0.414 | 0.547 |
| Cat Prod. (g/g) - MB (new = .249) | 368 | 395 |
| Product Data | | |
| Melt Index (MI) | 140.50 | <.1 |
| HLMI | 2083.17 | 0.25 |
| HLMI/MI Ratio | 14.83 | n/a |
| Density (g/cc) | 0.9733 | 0.9489 |
| Bulk Density (g/cc) | 0.4228 | 0.4745 |
| Mw (g/mol) | 22,558 | |
| Mn (g/mol) | 2,491 | |
| Mz (g/mol) | 91,551 | |
| Mw/Mn | 9.1 | |
| Mz/Mw | 4.16 | |
| Total Production (grams) | 10951 | 13015 |
| Number of Bedturnovers | 5.8 | 6.8 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. An ethylene polymer comprising ethylene and from 0 to 5 mole % of at least one comonomer, wherein the ethylene polymer has an Mw from 10,000 to 50,000 g/mol, an Mw/Mn of 1.5 to 4.5, a density of at least 0.925 g/cc or more, an unsaturation level of less than 1 per 1000 carbon atoms, a Tm of at least 120° C., a Tc of greater than Z° C., where Z=0.501× (density in kg/m$^3$)−367, an MI (I2) of 400 dg/min or more, and a Brookfield viscosity at 140° C. of 100,000 mPas or more.

2. The polymer of claim 1, wherein the polymer comprises up to 3 mol % of at least one alpha-olefin comonomer having 3 to about 12 carbon atoms.

3. The polymer of claim 1, wherein the polymer has an Mw of 20,000 to about 40,000 g/mol.

4. The polymer of claim 1, wherein the polymer has an Mw/Mn of about 2 to about 3.5.

5. The polymer of claim 1, wherein the polymer has a density of at least 0.930 g/cc.

6. The polymer of claim 1, wherein the polymer has a melting point of at least 125° C.

7. The polymer of claim 1, wherein the polymer has a branching index g' of at least 0.95.

8. A blend of at least first and second polymers, wherein the first polymer comprises the ethylene polymer of claim 1 and the second polymer has an Mw of at least 40,000 g/mol.

9. The blend of claim 8, wherein said second polymer has an Mw of at least 100,000 g/mol.

10. The blend of claim 8, wherein said second polymer has a density of 0.92 g/cc or less.

11. The blend of claim 8, wherein said second polymer has a density of at least 0.04 g/cc less than the density of the first polymer.

12. A process to produce an ethylene polymer comprising:
   1) contacting ethylene and optionally at least one comonomer at a temperature of about 60° C. to about 105° C. in the gas phase, in the presence of from 0 to 100×10$^{-6}$ mols of hydrogen per mole of ethylene, with a catalyst system comprising a support, a non-coordinating anion activator and a transition metal compound of the formula:

   $T_n ABHfX_2$ wherein T is a bridging group, n is 0 or 1, A and B are different substituted cyclopentadienyl ligands, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, provided that when n is 1, then A and B are represented by the formula: R*$_4$-Cp, where each R* is, independently, hydrogen or a C$_1$ to C$_8$ alkyl groups and that at least seven R* groups are not hydrogen;
   2) obtaining a polymer comprising ethylene and from 0 to 5 mole % of at least one comonomer, wherein the polymer has an Mw from 10,000 to 50,000 g/mol, an Mw/Mn of 1.5 to 4.5, a density of at least 0.925 g/cc or more, an unsaturation level of less than 1 per 1000 carbon atoms, a Tm of at least 120° C., a Tc of greater than Z° C., where Z=0.501×(density (in g/cc)×1000)−367, an MI (I2) of 400 dg/min or more, and a Brookfield viscosity at 140° C. of 100,000 mPas or more.

13. The process of claim 12, wherein said contacting is conducted in the presence of hydrogen present at a ratio of $2\times10^{-6}$ to $15\times10^{-6}$ moles of hydrogen per mole of ethylene.

14. The process of claim 12, wherein said contacting is conducted at a temperature of about 70° C. to about 100° C.

15. The process of claim 12, wherein said transition metal compound is supported on a support that has been calcined at 600° C. for at least 5 minutes.

16. The process of claim 12, wherein the transition metal compound is supported on silica which has been treated with an alkylaluminum compound.

17. The process of claim 12, wherein said transition metal compound is represented by the formula:

ABHfX$_2$ wherein A and B are different substituted cyclopentadienyl ligands that are not bridged, Hf is hafnium and each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof.

18. The process of claim 12, wherein said transition metal compound is represented by the formula:

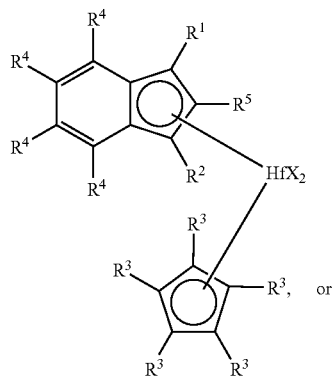 (I)

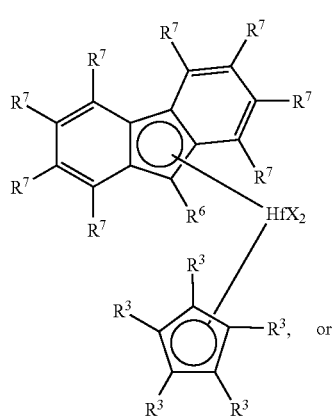 (II)

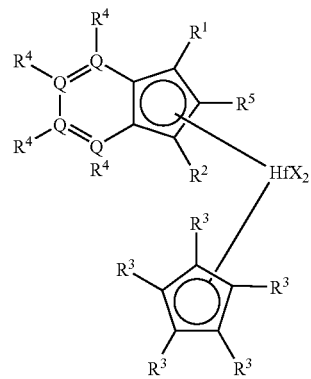 (III)

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each Q is, independently carbon or a heteroatom, provided that at least one Q is a heteroatom;
each $R^1$ is, independently, hydrogen or a $C_1$ to $C_8$ alkyl group;
each $R^2$ is, independently, hydrogen or a $C_1$ to $C_8$ alkyl group;
each $R^3$ is, independently, hydrogen, or a substituted or unsubstituted hydrocarbyl group having from 1 to 8 carbon atoms, provided however that at least three $R^3$ groups are not hydrogen;
each $R^4$ is, independently, hydrogen or a substituted or unsubstituted hydrocarbyl group, a heteroatom or heteroatom containing group;
$R^5$ is hydrogen or a $C_1$ to $C_8$ alkyl group;
$R^6$ is hydrogen or a $C_1$ to $C_8$ alkyl group;
each $R^7$ is, independently, hydrogen or a $C_1$ to $C_8$ alkyl group;
provided that any two adjacent R groups may form a fused ring or multicenter fused ring system where the rings may be aromatic, partially saturated or saturated.

19. The process of claim 12, wherein said transition metal compound is represented by a formula selected from:

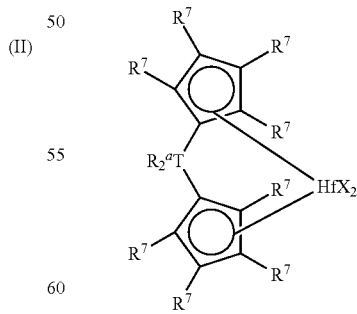

wherein
Hf is hafnium;
T is Si or Ge;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^7$ is, independently, hydrogen, or a $C_1$ to $C_8$ alkyl group provided however that at least seven $R^7$ groups are not hydrogen; and each $R^a$, is independently, hydrogen, halogen or a C1 to C20 hydrocarbyl, and two $R^a$ can form a cyclic structure including aromatic, partially saturated, or saturated cyclic or fused ring system.

20. The process of claim 12, wherein said transition metal compound is selected from:
(1,3-Dimethylindenyl)(pentamethylcyclopentadienyl)hafniumdimethyl,
(1,3,4,7-Tetramethylindenyl)(pentamethylcyclopentadienyl)hafniumdimethyl,
(1,3-Dimethylindenyl)(tetramethylcyclopentadienyl)hafniumdimethyl,
(1,3-Diethylindenyl)(pentamethylcyclopentadienyl)hafniumdimethyl,
(1,3-Dipropylindenyl)(pentamethylcyclopentadienyl)hafniumdimethyl,
(1-Methyl,3-propyllindenyl)(pentamethylcyclopentadienyl)hafniumdimethyl,
(1,3-Dimethylindenyl)(tetramethylpropylcyclopentadienyl)hafniumdimethyl,
(1,2,3-Trimethylindenyl)(pentamethylcyclopentadienyl)hafniumdimethyl,
(1,3-Dimethylbenzindenyl)(pentamethylcyclopentadienyl)hafniumdimethyl,
(2,7-Bis t-butylfluorenyl)(pentamethylcyclopentadienyl)hafniumdimethyl,
(9-Methylfluorenyl)(pentamethylcyclopentadienyl)hafniumdimethyl, and
(2,7,9-Trimethylfluorenyl)(pentamethylcyclopentadienyl)hafniumdimethyl.

21. The process of claim 12, wherein said activator is a fluorinated aryl borate.

22. An in-reactor process for producing the polymer blend of claim 8, the process comprising contacting ethylene and optionally at least one comonomer at a temperature of about 60° C. to about 105° C. in the gas phase with a first catalyst system comprising a hafnocene and a non-coordinating anion activator and with a second catalyst system capable of producing ethylene polymer having a density of at least 0.900 g/cc and an Mw of 40,000 to 500,000 g/mol, wherein the hafnocene is represented by the formula:

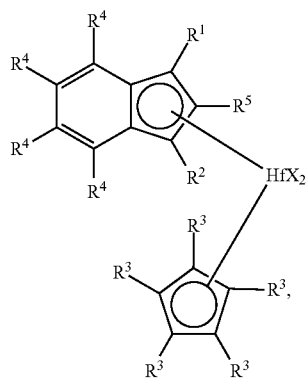

(I)

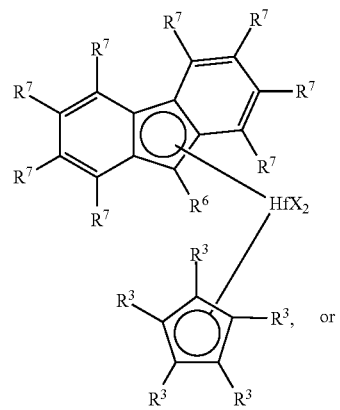

(II)

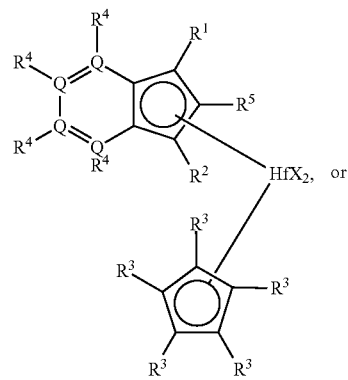

(III)

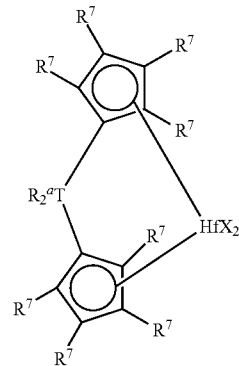

(IV)

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each Q is, independently carbon or a heteroatom, provided that at least one Q is a heteroatom;
each $R^1$ is, independently, hydrogen or a $C_1$ to $C_8$ alkyl group;
each $R^2$ is, independently, hydrogen or a $C_1$ to $C_8$ alkyl group;
each $R^3$ is, independently, hydrogen, or a substituted or unsubstituted hydrocarbyl group having from 1 to 8 carbon atoms, provided however that at least three $R^3$ groups are not hydrogen;
each $R^4$ is, independently, hydrogen or a substituted or unsubstituted hydrocarbyl group, a heteroatom or heteroatom containing group;

$R^5$ is hydrogen or a $C_1$ to $C_8$ alkyl group;

$R^6$ is hydrogen or a $C_1$ to $C_8$ alkyl group;

each $R^7$ is, independently, hydrogen, or a $C_1$ to $C_8$ alkyl group;

provided that any two adjacent R groups may form a fused ring or multicenter fused ring system where the rings may be aromatic, partially saturated or saturated;

T is Si or Ge; and each $R^a$, is independently, hydrogen, halogen or a C1 to C20 hydrocarbyl, and two $R^a$ can form a cyclic structure including aromatic, partially saturated, or saturated cyclic or fused ring system, and provided however that in formula (IV) at least seven $R^7$ groups are not hydrogen and adjacent $R^7$ groups in formula (IV) may not form aromatic cyclic rings.

23. The process of claim 22, wherein said first and second catalyst systems are provided in first and second reactors, respectively, connected in series.

24. A film produced from the polymer blend of claim 8.

25. An injection molded article produced from the polymer blend of claim 8.

26. The polymer of claim 1, having an MI (I2) of 600 dg/min or more.

27. The polymer of claim 1, having a Mw of 15,000 to 45,000 g/mol.

* * * * *